United States Patent
Godet et al.

(10) Patent No.: US 11,899,091 B2
(45) Date of Patent: Feb. 13, 2024

(54) METHOD FOR ESTIMATING THE DISTANCE SEPARATING A VEHICLE AND AN AUTHENTICATION DEVICE

(71) Applicants: Continental Automotive France, Toulouse (FR); Continental Automotive GmbH, Hannover (DE)

(72) Inventors: Sylvain Godet, Toulouse (FR); Dawid Durka, Toulouse (FR); Rachid Benbouhout, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 411 days.

(21) Appl. No.: 17/294,553

(22) PCT Filed: Dec. 10, 2019

(86) PCT No.: PCT/EP2019/084466
§ 371 (c)(1),
(2) Date: May 17, 2021

(87) PCT Pub. No.: WO2020/120491
PCT Pub. Date: Jun. 18, 2020

(65) Prior Publication Data
US 2022/0066009 A1    Mar. 3, 2022

(30) Foreign Application Priority Data
Dec. 11, 2018 (FR) ...................... 1872721

(51) Int. Cl.
*G01S 11/02* (2010.01)
*H04B 17/27* (2015.01)
*B60R 25/24* (2013.01)

(52) U.S. Cl.
CPC ............ *G01S 11/02* (2013.01); *B60R 25/245* (2013.01); *H04B 17/27* (2015.01)

(58) Field of Classification Search
CPC .. G01S 11/02–10; H04B 17/27; B60R 25/245
See application file for complete search history.

(56) References Cited

U.S. PATENT DOCUMENTS

| 8,519,878 B2 | 8/2013 | Jensen et al. |
| 8,547,253 B2 | 10/2013 | Proefke et al. |

(Continued)

FOREIGN PATENT DOCUMENTS

| CN | 102012506 A | 4/2011 |
| CN | 106553616 A | 4/2017 |

(Continued)

OTHER PUBLICATIONS

International Search Report and Written Opinion for International Application No. PCT/EP2019/084466, dated Feb. 11, 2020, with partial English translation, 9 pages.

(Continued)

*Primary Examiner* — Cassi J Galt
(74) *Attorney, Agent, or Firm* — RatnerPrestia (57) ABSTRACT

A method for estimating the distance between a vehicle and an authentication device, the vehicle including a computer and a plurality of communication modules capable of communicating with the device over a wireless communication link, each communication module including an electronic clock that defines the sampling frequency of the signals received from the device. The method includes in particular the steps of addition of noise to a response signal received from the device, of sampling of the noisy response signal, of detection, at a second instant, of the noisy response signal when the amplitude of the noisy response signal exceeds a predetermined detection threshold, of calculation of the time (Continued)

that has elapsed between a first instant and the second instant, and of estimation of the distance between the vehicle and the device based on the calculated time.

12 Claims, 6 Drawing Sheets

(56) References Cited

U.S. PATENT DOCUMENTS

| | | | |
|---|---|---|---|
| 9,635,515 B1* | 4/2017 | Ahirwar | G01S 13/76 |
| 9,761,075 B2 | 9/2017 | Yoshihara | |
| 10,564,254 B2 | 2/2020 | Benbouhout et al. | |
| 10,578,731 B2* | 3/2020 | Pature | G07C 9/00309 |
| 10,685,513 B2 | 6/2020 | Godet | |
| 2007/0139200 A1 | 6/2007 | Yushkov et al. | |
| 2010/0305779 A1 | 12/2010 | Hassan et al. | |
| 2015/0204978 A1* | 7/2015 | Hammes | G01S 13/10 |
| | | | 356/5.01 |
| 2017/0261591 A1* | 9/2017 | Zhang | G01S 5/12 |
| 2017/0272906 A1 | 9/2017 | Kerai | |
| 2019/0004168 A1 | 1/2019 | Pature et al. | |

FOREIGN PATENT DOCUMENTS

| | | |
|---|---|---|
| CN | 107422306 A | 12/2017 |
| CN | 107968766 A | 4/2018 |
| CN | 108475448 A | 8/2018 |
| FR | 3042631 A1 | 4/2017 |

OTHER PUBLICATIONS

International Search Report and Written Opinion for International Application No. PCT/EP2019/084466, dated Feb. 11, 2020, 15 pages (French).
Giovanelli D, et al., "RSSI or time-of-flight for bluetooth low energy based localization? An experimental evaluation," Sep. 3, 2018, 8 pages, XP033412621, 2018 11th IFIP Wireless and Mobile Networking Conference (WMNC), IFIP.
English Translation of the Written Opinion for International Application No. PCT/EP2019/084466, dated Feb. 11, 2020, 8 pages.
Chinese Office Action with Search Report for Chinese Application No. 201980081775.7, dated Nov. 1, 2023 with translation, 12 pages.

* cited by examiner

METHOD FOR ESTIMATING THE DISTANCE SEPARATING A VEHICLE AND AN AUTHENTICATION DEVICE

CROSS REFERENCE TO RELATED APPLICATIONS

This application is the U.S. National Phase Application of PCT International Application No. PCT/EP2019/084466, filed Dec. 10, 2019, which claims priority to French Patent Application No. 1872721, filed Dec. 11, 2018, the contents of such applications being incorporated by reference herein.

FIELD OF THE INVENTION

The invention relates to detection systems for motor vehicles, and more particularly to a method and to a computer for estimating the distance between an authentication device and a vehicle in order in particular to remotely activate functions of said vehicle.

BACKGROUND OF THE INVENTION

Nowadays, some motor vehicles are equipped with a detection system allowing a device carried by the user to be authenticated remotely, for example an electronic ignition key or fob, in order to implement certain functions from outside said vehicle. For example, such a detection system may be used in order to unlock the opening elements of the vehicle, in particular the passenger doors or the trunk, or to activate welcoming functions, such as for example ambient lighting or adjustment of the seats.

For security reasons, it is known practice to configure the system so as to activate these functions only when the user is located at a distance less than a predetermined distance, called "detection distance", which depends on the function to be activated. For example, a function of unlocking the opening elements may be activated only when the user is located within two meters of the vehicle. Again for example, a welcoming lighting function may be activated only when the user is located within five meters of the vehicle or a request to maneuver the vehicle, commonly called "remote parking", may be activated only when the user is located within six meters of the vehicle.

In one known solution, the vehicle and the device communicate over LF/RF (Low Frequency/RadioFrequency) wireless communication links. In this solution, the vehicle periodically transmits a detection signal over an LF communication link. When the device receives this detection signal, it responds to the vehicle over an RF communication link in order to authenticate itself. In order to determine the distance between the user and the vehicle, the vehicle measures the power of the signals received from the authentication device during these exchanges and deduces the distance therefrom. The advantage of this type of technology is that the propagation of the signals is not impacted by mechanical elements such as the vehicle body.

For practical reasons, it is nowadays known practice to use a smartphone to authenticate oneself to the vehicle. However, the majority of smartphones used nowadays do not have an LF/RF communication interface. In order to rectify this drawback, it is known practice to use a Bluetooth® communication interface, in particular a BLE (Bluetooth® Low Energy) interface, present on the majority of modern smartphones. The exchanges are carried out on such an interface using frames encoded in a signal called a "BLE signal".

In order to determine the distance between the device and the vehicle, the vehicle receives the BLE signals transmitted by the smartphone and determines the power thereof, for example by measuring a received signal strength indication (RSSI) in order to deduce the distance therefrom. However, as is known and commonly the case, the RSSI measurement may be distorted when the signal sent by the smartphone splits into a signal received in a direct line and one or more signals that bounce off one or more obstacles before reaching the vehicle (called a "multipath" signal). In this case, the power of the combined signal received by the vehicle may be either greater than or less than the actual value of the signal received in a direct line, thereby distorting the estimation of the distance.

In order to rectify this drawback, it is known practice to determine the distance between the vehicle and the device by evaluating the communication time of the signals between the vehicle and the device. To this end, it is known practice to have the vehicle transmit what is called a "request" signal, the device responding in a known manner with what is called a "response" signal after a predetermined period of 150 microseconds in the BLE protocol. The vehicle, knowing the instant of transmission of the request signal, the period between the reception of the request signal and the transmission of the response signal by the device and the instant of reception of the response signal, then deduces therefrom the average time of flight of the signals and the distance between the vehicle and the device.

Figure 1:
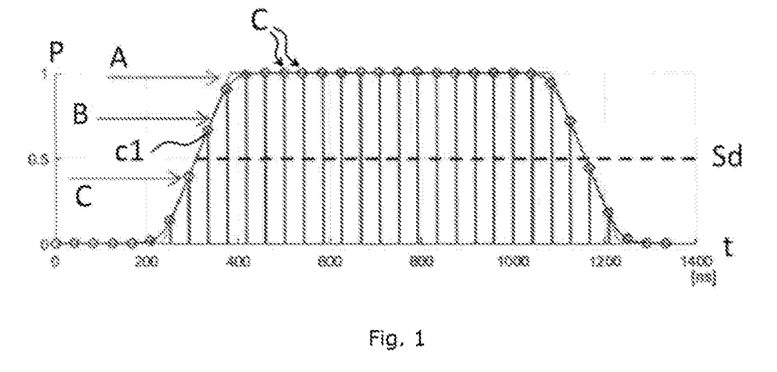
FIG. 1 graphically illustrates the variation in power of a signal received by the communication module as a function of time from the prior art.

As is known, the BLE communication modules of the vehicle filter and sample each received signal and detect that a signal is a BLE signal when a predetermined signal power detection threshold has been exceeded, the exceedance of this threshold being detected only at the time of a sample of said signal. FIG. 1 shows the superimposition of one example of a response signal that is unfiltered and noise-free A and, by way of comparison, of the same response signal in filtered form B and also of said response signal in filtered and sampled form C, the power P of these signals being shown as a function of time t. The response signal RESP in sampled and filtered form C is detected when one c1 of the samples exceeds the predetermined detection threshold Sd.

The time interval between two samples therefore determines the maximum error that is able to occur on the distance measurement. By way of example, using a quartz clocked at 24 MHz for sampling the BLE signal leads to an error of plus or minus 6.25 meters, thereby exhibiting a significant drawback, or even a major one if it is necessary to detect the user within 2, 5 or 6 meters of the vehicle in order to activate certain functions thereof.

In addition, the receiver may receive multiple signals for one and the same signal sent by the transmitter, since said signal may bounce off obstacles when it propagates, thus creating multiple components of the same signal. In this case, the detection is carried out on one of the received signals, the first one for which exceedance of the threshold on the sample is detected, which may again cause an error in the estimation of the actual distance between the transmitter and the receiver. This type of detection system therefore has notable technical limitations that may at times render it ineffective.

SUMMARY OF THE INVENTION

The aspect of the invention is therefore to at least partly rectify these drawbacks by proposing a simple and reliable solution for estimating the distance between a vehicle and an authentication device and to effectively remotely activate functions of a vehicle.

To this end, one subject of the invention is a method for estimating the distance between a vehicle, in particular a motor vehicle, and an authentication device, said vehicle comprising a computer and a plurality of communication modules each capable of communicating with said device over a wireless communication link, each communication module comprising an electronic clock that defines the sampling frequency of the signals received from the device, said method being noteworthy in that it comprises the steps of:

transmission, by at least one of the communication modules, of a request signal destined for the device at a first instant,
  reception of said request signal by the device,
  transmission, by the device, of a response signal destined for at least one of the communication modules of the vehicle,
  reception, by at least one of the communication modules, of said response signal,
  addition of noise to the received response signal,
  sampling of the noisy response signal,
  detection, at a second instant, of the noisy response signal when the amplitude of said noisy response signal exceeds a predetermined detection threshold,
  calculation of the time that has elapsed between the first instant and the second instant,
  estimation of the distance between the vehicle and the device based on the calculated time.

The addition of noise, preferably white noise, more preferably Gaussian white noise, to the received response signal allows the response signal to cross the detection threshold in a random manner between the two samples surrounding the detection threshold, that is to say on average earlier than the sample that leads to the detection of the response signal, thereby potentially making it possible to reduce the error on the estimation of the distance by substantially half. Such addition of white noise appears to be counter-intuitive to a person skilled in the art, since said person seeks in principle to reduce or even to eliminate the presence of noise in signals, in particular signals used to estimate distances. In addition, in order to solve the technical problem addressed, a person skilled in the art would naturally have tended to increase the sampling frequency, for example by doubling it, in order to obtain similar results, which would have been particularly costly insofar as electronic clocks, in particular piezoelectric clocks, operating at frequencies greater than 30 MHz are particularly expensive.

In one embodiment, the method comprises, between the addition of noise to the received response signal and the sampling of the noisy response signal, a step of filtering the received response signal. Such filtering makes it possible to "smooth" the noisy signal, by at least partially filtering out the noise, so as to avoid untimely detections caused by the noise level around the detection threshold. The added noise will shift the detection time at the output of the filter and thus improve the detection time. The filter has the role of filtering the injected noise, while at the same time maintaining a delay corresponding to the noise, but also of defining the optimum rise time of the received signal in order to improve the performance of the method. When no filtering is applied, detection may prove to be faster since the noise is eliminated by correlation and does not introduce any additional delay caused by the filter (filter delay). The absence of filtering may also make it possible to increase the temporal resolution of the distance determination.

The added noise is preferably characterized by a variance of between 0.01 and 0.1, for example of the order of 0.05, which represents an advantageous compromise between the desired accuracy and the number of samples necessary for detecting the received signal. In particular, the variance of the added noise is greater than 0.0015, in particular in the absence of filtering of the received response signal in order to make it possible to refine the estimation of the distance.

According to one aspect of the invention, the method is repeated a plurality of times so as to estimate a plurality of distance values.

Advantageously, the method comprises a step of calculating what is called an "actual" distance based on the plurality of estimated distances, for example by calculating the median or the average of the estimated distances.

The actual distance is preferably calculated once the number of estimated distances has exceeded what is called an "acquisition" threshold.

According to one aspect of the invention, the acquisition threshold is greater than 10, preferably greater than 100, in order to refine the estimation of the actual distance in line with the distance estimations that are made based on multiple received signals, preferably consecutively. Such iterations make it possible to refine the estimation of the distance so as to make it relatively accurate and for example reduce the error to less than two meters, preferably to less than 50 centimeters.

In one preferred embodiment, the wireless communication link is a Bluetooth® Low Energy (BLE) link.

In one embodiment, the electronic clock is a piezoelectric element. However, it goes without saying that any type of clock suitable for this application could be used.

Advantageously, the sampling frequency of each communication module is less than 50 MHz, preferably of the order of 24 MHz, piezoelectric elements operating at this frequency of 24 MHz being common and therefore less expensive.

Advantageously, the method comprises, following the step of estimating the distance, a step of saving the estimated distance value in a memory area.

The method preferably comprises, following the step of estimating the distance or of calculating the actual distance, a step of activating at least one function of the vehicle when the estimated distance is less than a predetermined distance. The predetermined distance may for example be two, five or six meters.

The wireless communication link preferably makes it possible to exchange signals in the UHF (Ultra High Frequencies) frequency band between 300 and 3000 MHz. Again preferably, the wireless communication link operates in accordance with the BLE (Bluetooth® Low Energy) standard.

An aspect of the invention also relates to a communication module for a vehicle, said communication module being capable of communicating with a device for authenticating a user of said vehicle over a wireless communication link, each communication module comprising an electronic clock that defines the sampling frequency of the signals received from the device, the communication module being configured so as to:

transmit, over the wireless communication link, a request signal destined for the device at a first instant,
  receive, over the wireless communication link, a response signal sent by the device following the reception, by said device, of the transmitted request signal, add noise to the received response signal,
sample the noisy response signal,
detect, at a second instant, the noisy response signal when the amplitude of said noisy response signal exceeds a predetermined detection threshold,
send the value of the second detected instant to a computer so that said computer estimates the distance between the vehicle and the device.

The added noise is preferably white noise, preferably Gaussian white noise.

In one embodiment, the communication module is configured so as to filter the received response signal.

The added noise is preferably characterized by a variance of between 0.01 and 0.1, for example of the order of 0.05. In particular, the variance of the added noise is greater than 0.0015 in the absence of filtering of the received response signal.

In one preferred embodiment, the wireless communication link is a Bluetooth® Low Energy (BLE) link.

In one embodiment, the electronic clock is a piezoelectric element. However, it goes without saying that any type of clock suitable for this application could be used.

Advantageously, the sampling frequency of each communication module is less than 50 MHz, preferably of the order of 24 MHz.

According to one aspect of the invention, the communication module is configured so as to exchange signals in the UHF (Ultra High Frequencies) frequency band between 300 and 3000 MHz, preferably in accordance with the BLE (Bluetooth® Low Energy) standard.

An aspect of the invention also relates to a vehicle computer, in particular a motor vehicle computer, for estimating the distance between said vehicle and an authentication device, said vehicle comprising a plurality of communication modules, as presented above, said computer being noteworthy in that it is configured so as to:
command the transmission, by at least one of the communication modules, of a request signal destined for the device at a first instant,
receive, from at least one communication module, the value of a second instant detected by said at least one communication module,
calculate the time that has elapsed between the first instant and the second instant, and
estimate the distance between the vehicle and the device based on the calculated time.

Advantageously, the computer is configured so as to save the estimated distance value in a memory area.

According to one aspect of the invention, the computer is configured so as to estimate a plurality of corresponding distances.

Advantageously, the computer is configured so as to calculate a distance, called "actual" distance, based on the plurality of corresponding distances, for example by calculating the median or the average of the estimated distances.

The computer is preferably configured so as to calculate the actual distance once the number of estimated distances has exceeded what is called an "acquisition" threshold.

According to one aspect of the invention, the acquisition threshold is greater than 10, preferably greater than 100, in order to refine the estimation of the actual distance in line with the distance estimations that are made based on multiple received signals, preferably consecutively. Such iterations make it possible to refine the estimation of the distance so as to make it relatively accurate and for example reduce the error to less than two meters, preferably to less than 50 centimeters.

The computer is preferably configured so as to activate at least one function of the vehicle when the estimated distance or the actual distance is less than a predetermined distance, for example two, five or six meters.

An aspect of the invention also relates to a vehicle, in particular a motor vehicle, comprising a computer as presented above and a plurality of communication modules as presented above.

An aspect of the invention also relates to a detection system comprising a vehicle, as presented above, and an authentication device capable of communicating with the plurality of communication modules of said vehicle over a wireless communication link, preferably in the UHF (Ultra High Frequencies) frequency band between 300 and 3000 MHz, more preferably in accordance with the BLE (Bluetooth® Low Energy) standard.

BRIEF DESCRIPTION OF THE DRAWINGS

Further features and advantages of aspects of the invention will become apparent from the description that follows, which is provided with reference to the appended figures, which are provided as non-limiting examples and in which identical references are given to similar objects.

DETAILED DESCRIPTION OF THE PREFERRED EMBODIMENTS

The detection system according to an aspect of the invention is intended to be installed in a vehicle, in particular a motor vehicle, in order to detect an authentication device carried by a user of said vehicle. Such an authentication device may, for example, be in the form of a fob, of an electronic ignition key or of a smartphone. The authentication device allows the user to authenticate himself to the vehicle in order to implement certain functions, such as for example a vehicle lighting function or else a function of unlocking the opening elements of the vehicle (passenger doors, trunk, etc.). For security reasons, it is known practice to configure the system so as to activate these functions only when the user is located at a distance less than a predetermined distance, called "detection distance", which depends on the function to be activated. For example, the unlocking function may be activated only when the user is located within two meters of the vehicle.

Figure 2:
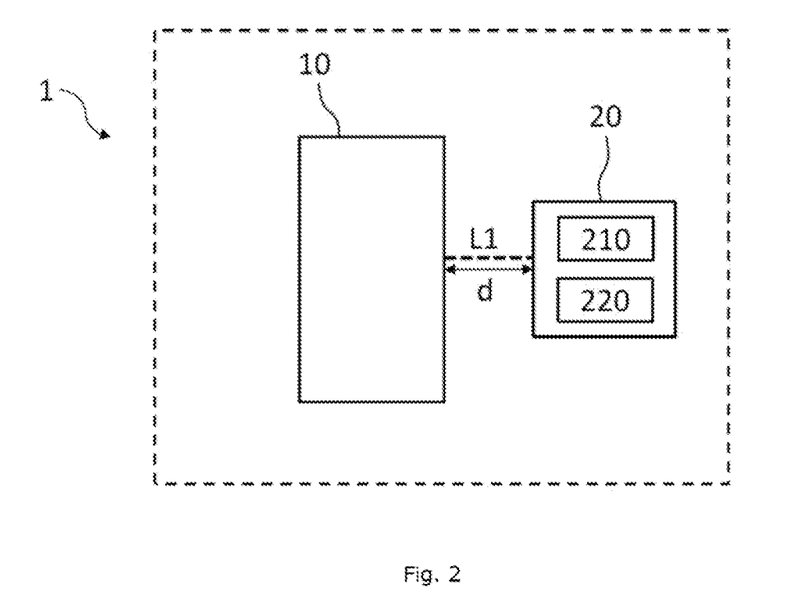
FIG. 2 schematically illustrates one embodiment of a detection system according to the invention.
Figure 3:
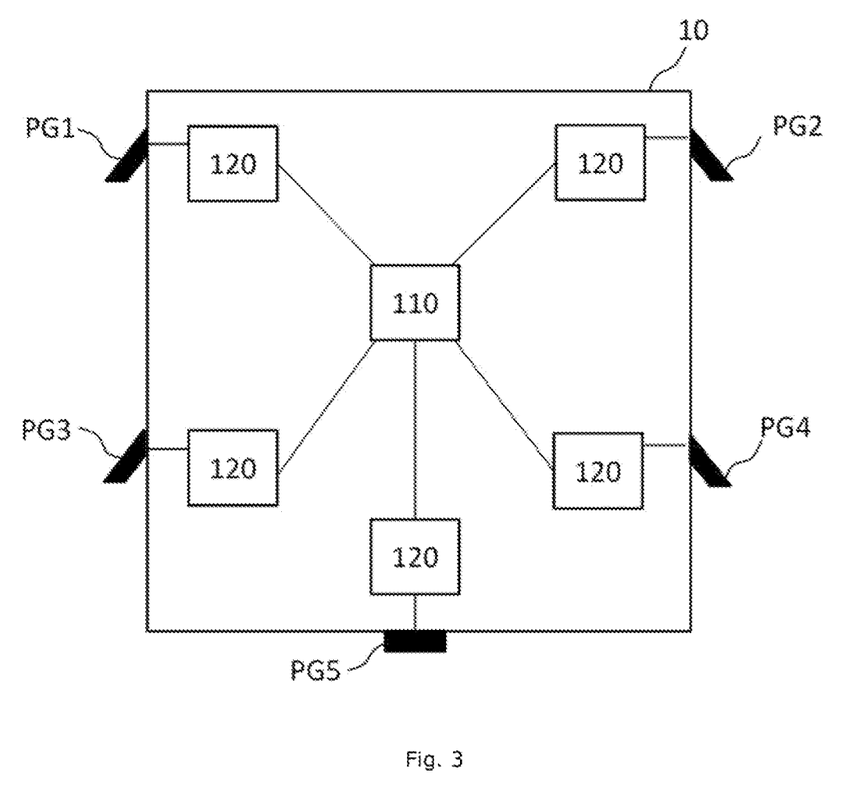
FIG. 3 schematically illustrates one embodiment of a vehicle according to the invention.

FIG. 2 schematically shows a detection system 1 according to an aspect of the invention. The detection system 1 comprises a vehicle 10 and an authentication device 20. With reference to FIG. 3, the vehicle 10 comprises a computer 110, for example an ECU (Electronic Control Unit), and a plurality of communication modules 120.

Again with reference to FIG. 2, the authentication device 20 comprises a management module 210 and a communication unit 220. The authentication device 20 is preferably a smartphone, without this limiting the scope of the present invention.

The communication modules 120 and the communication unit 220 are preferably configured so as to communicate over a wireless communication link L1 in the UHF (Ultra High Frequencies) frequency band between 300 and 3000 MHz, more preferably in accordance with the BLE ("Bluetooth® Low Energy") standard. BLE technology allows in particular low-energy communication and is advantageously integrated into the majority of modern smartphones. Since BLE technology is known per se, it will not be described in more detail here.

An aspect of the invention will be described below in terms of its application to the unlocking of the opening elements of the vehicle 10, without this limiting the scope of the present invention.

If the vehicle 10 is unlocked with manual activation of a handle of opening elements of the vehicle 10, the number of communication modules 120 is advantageously equal to the number of opening element handles of said vehicle 10. For example, with reference to FIG. 3, a vehicle 10 comprises five opening elements, four passenger doors and the door of the trunk, respectively having a handle PG1, PG2, PG3, PG4 and PG5, each handle PG1, PG2, PG3, PG4, PG5 being connected both to a dedicated communication module 120 and to the computer 110.

Figure 4:
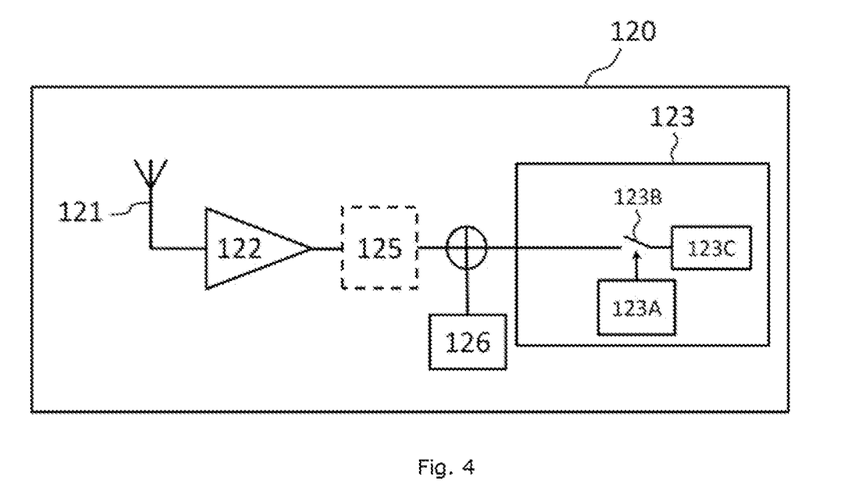
FIG. 4 schematically shows one embodiment of a communication module of the vehicle according to the invention.

With reference to FIG. 4, each communication module 120 on board the vehicle 10 comprises an antenna 121, an amplifier 122 and a baseband circuit 123.

The antenna 121 makes it possible to receive the signals sent by the device 20 or to transmit signals destined for the device 20 over the wireless communication link L1.

The amplifier 122 makes it possible to amplify the received signals, which have an attenuated power owing to their propagation through the air. By way of example, the amplifier 122 may be a low-noise amplifier, commonly abbreviated to "LNA" by a person skilled in the art.

The baseband circuit 123 makes it possible to sample the received signals, that is to say to digitize them, such that they are able to be used by the computer 110. For this purpose, the baseband circuit 123 comprises an electronic clock, in this example in the form of a piezoelectric element 123A, a switch 123B and a signal detection module 123C. The piezoelectric element 123A comprises a quartz clocked at a predetermined frequency, for example 24 MHz, in order to control the switch 123B at said frequency. The switch 123B makes it possible to sample the received signals. The signal detection module 123C receives the signals sampled by the switch 123B in order to detect the response signals received from the device 20.

According to an aspect of the invention and in the illustrated embodiment, the communication module 120 furthermore comprises a low-pass filter module 125 (optional) and a noise addition module 126. The low-pass filter module 125 is configured so as to reduce the frequency of the signals received via the antenna 121. The noise addition module 126 is configured so as to generate noise, preferably Gaussian white noise, and add it to each of the signals received via the antenna 121. The added noise is characterized by a variance of between 0.01 and 0.1, for example of the order of 0.05. In particular, the variance of the added noise is greater than 0.0015 in the absence of the low-pass filter module 125. The addition module 126 may for example be formed by one diode or multiple diodes, which are generator(s) of a noise source.

Figure 5:
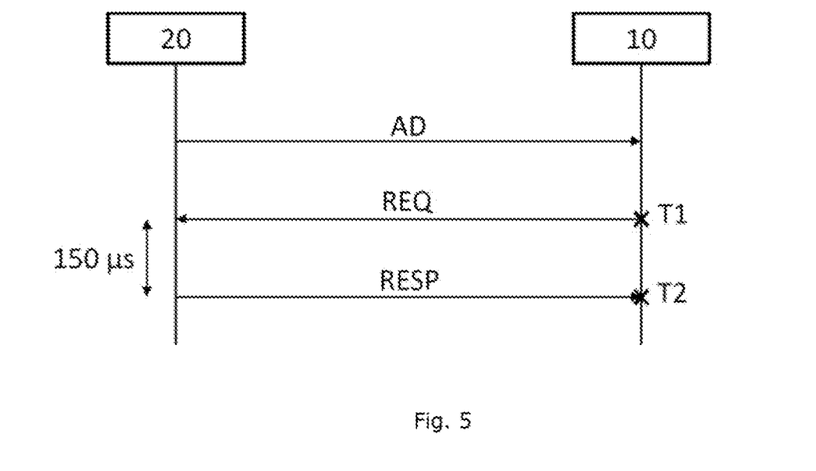
FIG. 5 schematically shows the exchanges of BLE signals between a vehicle and an authentication device.

With reference to FIG. 5, the baseband circuit 123 is furthermore configured so as to detect, at a second instant T2, a noisy response signal RESP, sent in response to a request signal REQ transmitted beforehand by the antenna 121 at a first instant T1, when the amplitude of said noisy and delayed response signal exceeds a predetermined detection threshold. The request signal REQ is transmitted by the antenna 121 following the reception of a detection signal AD transmitted by the communication unit 220 of the authentication device 20. The baseband circuit 123 is furthermore configured so as to send the value of the second detected instant T2 to the computer 110, so that said computer 110 estimates the distance between the vehicle 10 and the device 20.

To this end, with continuing reference to FIG. 5, the computer 110 of the vehicle 10 is configured so as to command the transmission, by at least one of the communication modules 120, of a request signal REQ destined for the device 20 at a first instant T1, to receive, from at least one communication module 120, the value of a second instant T2 detected by said at least one communication module 120, to calculate the time that has elapsed between the first instant T1 and the second instant T2, and to estimate the distance between the vehicle 10 and the device 20 based on the calculated time.

In one preferred embodiment, the computer 110 is configured so as to save the estimated distance value in a memory area, to estimate a plurality of corresponding distances, to calculate what is called an "actual" distance based on the plurality of corresponding distances, for example by calculating the median or the average of the estimated distances, and to calculate the actual distance once the number of estimated distances has exceeded what is called an "acquisition" threshold. This acquisition threshold is preferably greater than 10 or even 100 in order to refine the estimation of the actual distance in line with distance estimations that are made consecutively. Such iterations make it possible to refine the estimation of the distance so as to make it relatively accurate and reduce the value of the error, preferably to less than 50 centimeters.

Lastly, the computer 110 is configured so as to activate at least one function of the vehicle 10 when the estimated distance or the actual distance is less than a predetermined distance, for example two, five or six meters.

An aspect of the invention will now be described in terms of its implementation.

Figure 6:
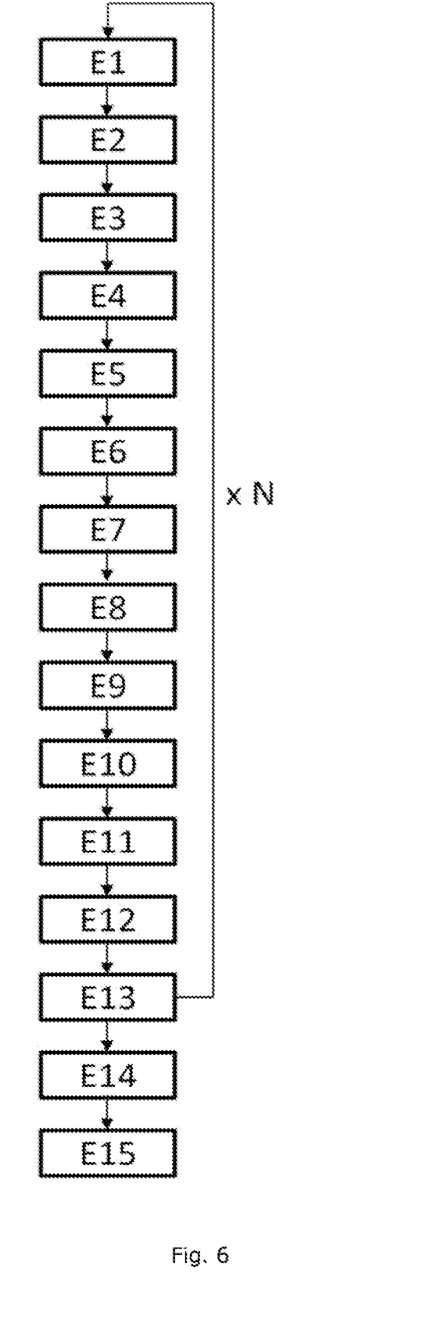
FIG. 6 schematically illustrates one embodiment of the method according to the invention.

First of all, with reference to FIG. 6, with the opening elements of the vehicle 10 being locked and the engine being at a standstill, in particular when the vehicle 10 is parked, the management module 210 of the device 20 commands the communication unit 220 such that said communication unit 220, in a step E1, transmits a detection signal AD, called "advertising" signal by a person skilled in the art. This detection signal AD is transmitted periodically, for example with a period of between 20 milliseconds and 10.24 seconds.

When at least one of the communication modules 120 is within the radio coverage of the device 20 and receives this detection signal AD (step E2), the computer 110 responds to the device 20 and commands, at a first instant T1, the transmission of a request signal REQ by at least one of the communication modules 120 (step E3) in order to ask the device 20 for its identifier in order to authenticate it. The computer 110 records the value of the first instant T1 and awaits the response from the device 20.

At the end of a predefined period, for example of 150 μs, after receiving (step E4) the request signal REQ, the management module 210 of the device 20 commands the transmission of a response signal RESP in a step E5, comprising in particular the identifier of the device 20 so that the vehicle 10 authenticates it.

This response signal RESP is received via the antenna 121 of at least one of the communication modules 120 in a step E6 and filtered by the low-pass filter module 125 of said communication module 120, where applicable, in a step E7.

The noise addition module 126 then adds noise to the received response signal in a step E8, which is transmitted to the switch 123B in order to be sampled in a step E9. The signal detection module 123C detects (step E10), at a second instant T2, this noisy response signal when the amplitude of said signal exceeds a predetermined detection threshold, for example by a value equivalent to half the amplitude of the clock signal, which may for example have an amplitude of 5 V, 3.3 V or 1.2 V depending on the technologies that are used.

Once it has detected the response signal RESP, the signal detection module 123C, in a step E11, transmits this detection information to the computer 110 in the same way as the detection signal AD was received, that is to say through the RF reception stage of the BLE component, and then the computer 110 decodes this detection information in the baseband portion (bottom layers).

The computer 110, in a step E12, calculates the time that has elapsed between the first instant T1 and the second instant T2 and then, in a step E13, estimates the distance between the vehicle 10 and the device 20 based on the calculated time. More precisely, the computer 110 records the second instant T2 and calculates the average time of flight of the signals, which corresponds to the period that has elapsed between the first instant T1 and the second instant T2 minus 150 μs, divided by two. The computer 110 estimates the distance d (FIG. 2) between the vehicle 10 and the device 20 between these two instants using the following formula:

$$d = c \cdot \left[\left(\frac{T2-T1}{2}\right) - 0.00015\right]$$

where "d" is the distance in meters, "c" is the speed of light, "T1" and "T2" are given in seconds, 0.00015 seconds (150 microseconds) corresponding to the predefined period between the reception of the request signal REQ and the transmission of the response signal RESP.

Once the distance d has been estimated, the computer 110 again commands the transmission of a request signal REQ, such that steps E1 to E13 of the method are repeated, and so on, generating, at each iteration, an estimated distance that is stored by the computer 110.

Steps E1 and E13 are repeated a number N of times until reaching an acquisition threshold Nb, for example greater than 10, preferably greater than 100.

Once the acquisition threshold Nb has been reached, the computer 110, in a step E14, calculates a distance, called "actual" distance, based on the plurality of corresponding distances, for example by calculating the median or the average of the estimated distances.

If the actual distance is less than the detection distance, the computer 110, in a step E15, triggers one or more corresponding functions of the vehicle 10, for example unlocking the opening elements of said vehicle 10 when the actual distance is less than two meters. In the opposite case, if the actual distance is greater than the detection distance, one or more functions implemented remotely by the vehicle 10 remain inactivated.

Figure 7:
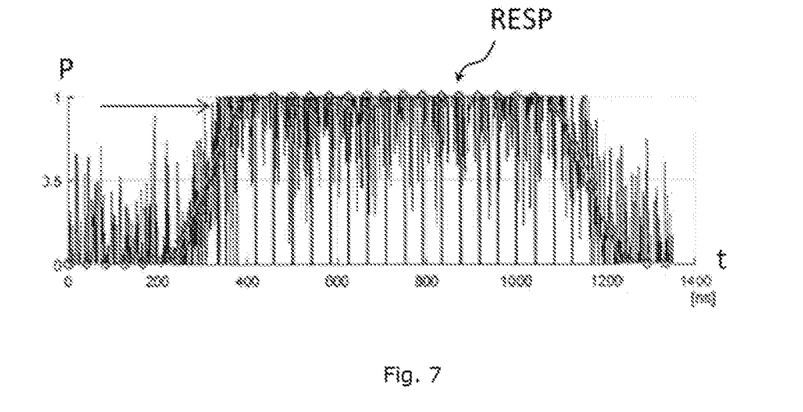
FIG. 7 graphically illustrates one example of a variation in power of a signal received by the communication module according to an aspect of the invention as a function of time.

FIG. 7 illustrates the response signal RESP from FIG. 1 with noise added by the noise addition module 126. The noise added to the response signal makes it possible to detect the signal more quickly than in the solution from the prior art, at the same sampling frequency.

Figure 8:
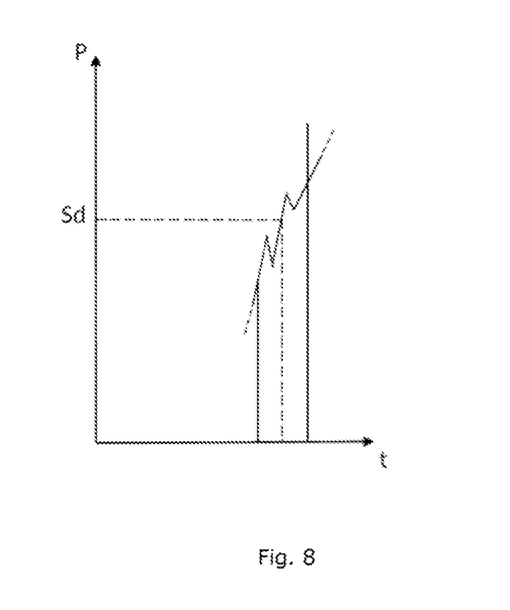
FIG. 8 is a magnified view of FIG. 7 between two signal samples.

FIG. 8 illustrates a magnified view of FIG. 7 between two samples between which the received response signal RESP is detected as soon as the noisy signal exceeds the detection threshold Sd.

Figure 9:
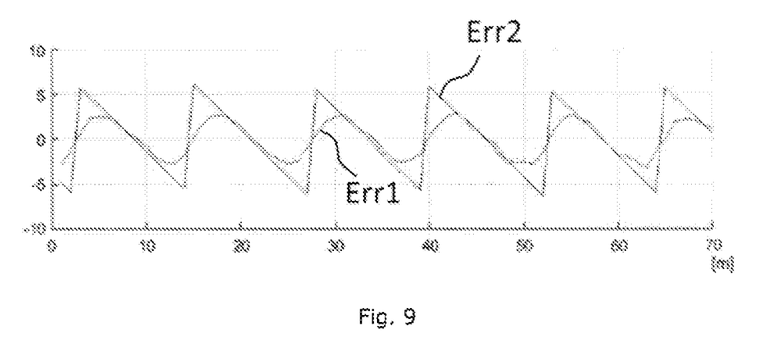
FIG. 9 is a test result showing the evolution of the error on the estimated distance as a function of said estimated distance.

FIG. 9 shows the variation in the error (in meters) on the estimated distance as a function of said distance (in meters). It is observed that the value of the error Err1 of the noisy signal according to an aspect of the invention is of the order of half the value of the error Err2 of the non-noisy signal from the prior art.

Figure 10:
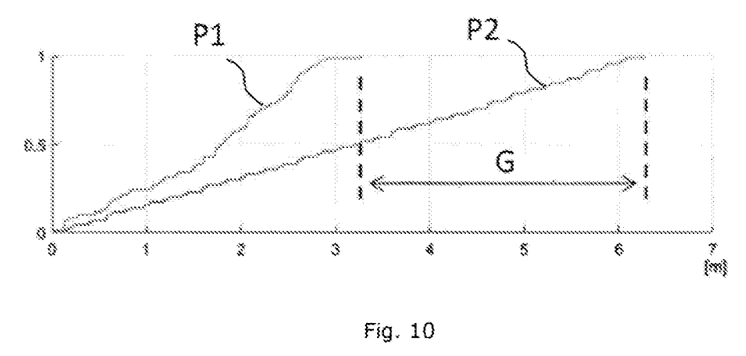
FIG. 10 is a test result showing the cumulative probability as a function of the estimated distance.

FIG. 10 represents the cumulative probability P1 as a function of the error Err1 of the noisy signal from FIG. 9 and the cumulative probability P2 as a function of the error Err2 of the non-noisy signal from FIG. 9. It is observed that the error Err1 turns out to be less than approximately 3.30 meters, while the error Err2 was less than approximately 6.30, that is to say a gain G of the order of 3 meters on the estimated distance error.

The addition of white noise makes it possible to vary the instant at which the detection threshold is exceeded in a random manner from one detection signal to another, such that the error on the estimation of the actual distance tends toward zero when the number of measurement phases increases, thus significantly improving the accuracy of the detection system 1.

The invention claimed is:

1. A method for estimating the distance between a vehicle and an authentication device, said vehicle comprising a computer and a plurality of communication modules each capable of communicating with said device over a wireless communication link, each communication module comprising an electronic clock that defines the sampling frequency of the signals received from the device, said method comprising:

transmission, by at least one of the communication modules, of a request signal destined for the device at a first instant, reception of said request signal by the device, transmission, by the device, of a response signal destined for at least one of the communication modules of the vehicle, reception, by at least one of the communication modules, of said response signal, addition of noise to the received response signal, sampling of the noisy response signal, detection, at a second instant, of the noisy response signal when the amplitude of said noisy response signal exceeds a predetermined detection threshold, calculation of the time that has elapsed between the first instant and the second instant, and estimation of the distance between the vehicle and the device based on the calculated time.

2. The detection method as claimed in claim 1, wherein the added noise is characterized by a variance of between 0.01 and 0.1.

3. The detection method as claimed in claim 1, wherein the method is repeated a plurality of times so as to estimate a plurality of distance values (d).

4. The detection method as claimed in claim 3, comprising a step of calculating what is called an "actual" distance based on the plurality of estimated distances.

5. The detection method as claimed in claim 4, wherein the actual distance corresponds to the median or the average of the estimated distances.

6. The detection method as claimed in claim 4, wherein the actual distance is calculated once the number of estimated distances has exceeded an acquisition threshold.

7. The detection method as claimed in claim 6, wherein the acquisition threshold is greater than 10.

8. A communication module for a vehicle, said communication module being capable of communicating with a device for authenticating a user of said vehicle over a wireless communication link, each communication module comprising an electronic clock that defines the sampling frequency of the signals received from the device, the communication module being configured so as to:
- transmit, over the wireless communication link, a request signal destined for the device at a first instant,
- receive, over the wireless communication link, a response signal sent by the device following the reception, by said device, of the transmitted request signal,
- add noise to the received response signal,
- sample the noisy response signal,
- detect, at a second instant, the noisy response signal when the amplitude of said noisy response signal exceeds a predetermined detection threshold, and
- send the value of the second detected instant to a computer so that said computer estimates the distance between the vehicle and the device.

9. A vehicle comprising a plurality of communication modules as claimed in claim 8, and a computer for estimating the distance between said vehicle and an authentication device, said computer being configured so as to:
- command the transmission, by at least one of the communication modules, of a request signal destined for the device at the first instant,
- receive, from at least one communication module, the value of the second instant detected by said at least one communication module,
- calculate the time that has elapsed between the first instant and the second instant, and
- estimate the distance between the vehicle and the device based on the calculated time.

10. A detection system comprising a vehicle as claimed in claim 9 and an authentication device capable of communicating with the plurality of communication modules of said vehicle over the wireless communication link.

11. The detection method as claimed in claim 5, wherein the actual distance is calculated once the number of estimated distances has exceeded an acquisition threshold.

12. The detection method as claimed in claim 2, wherein the method is repeated a plurality of times so as to estimate a plurality of distance values.

* * * * *